Patented Oct. 1, 1940

2,216,431

UNITED STATES PATENT OFFICE 2,216,431

DENATURED ALCOHOL CONTAINING A SALT OF A LOWER ALKYL ISOTHIOUREA

Hans T. Clarke, New York, N. Y., assignor to Eastman Kodak Company, Rochester N. Y., a corporation of New Jersey No Drawing. Application May 18, 1939,
Serial No. 274,466

3 Claims.  (Cl. 202—77)

This invention relates to the denaturing of ethyl alcohol, and to alcohol so denatured.

It is an object of my invention to provide a denaturant which will render ethyl alcohol containing it unfit for use as a beverage, which cannot be economically removed from the alcohol by any known methods, which will not render the alcohol unfit for industrial uses in which denatured alcohol has customarily been employed, and which will be free from methanol. It is a further object of my invention to provide denatured alcohol which, when an attempt is made to free it from its denaturants, becomes even more unpotable. Other objects will hereinafter appear.

I have discovered that a lower alkyl isothiourea is a particularly effective denaturant. Methyl, ethyl, propyl and butyl isothiourea may be used in the form of their salts, such as the hydrochlorides, hydrobromides, hydriodides, or sulfates. Some of these salts are sparingly soluble in alcohol, but more soluble in water. When a sparingly soluble salt is used, it is best to dissolve it first in water, and add the aqueous solution to the alcohol to be denatured. The lower alkyl isothiourea salts are odorless or nearly so, and impart a disagreeable taste to ethyl alcohol.

When illicit attempts are made to "clean" denatured alcohol, a strong alkali such as sodium hydroxide is almost invariably used. The usual procedure is to add the strong alkali to the still pot which contains the denatured alcohol, apply heat and distill. If the alcohol contains a lower alkyl isothiourea salt, when it is heated with a strong alkali the alkyl isothiourea decomposes to form the corresponding alkyl mercaptan. This decomposition also takes place, although to a somewhat less extent, when the denatured alcohol is heated with sodium chloride instead of with an alkali.

The lower alkyl mercaptans are substances of foul odor; they are, however, non-toxic. The use of mercaptans as denaturants has, in fact, been suggested in the prior art, but their use is impractical because alcohol containing them has such a foul odor that it is unfit for commercial uses. By my invention, however, denatured alcohol is produced which is inoffensive for industrial uses, and which, upon an attempt to remove the denaturant, acquires a foul odor.

From 0.1 gram to 5 grams of any of my novel denaturants per 100 cc. of 95% ethyl alcohol is efficacious for denaturing, but more may be used if desired. On account of the cost of these denaturants, I prefer to use from 0.1 gram to 0.5 gram per 100 cc. of 95% alcohol.

The alkyl isothioureas have the structural formula

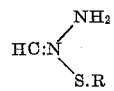

R being an alkyl group, and are formed, as salts, when alkyl halides or sulfates are added to thiourea. Thus for example:

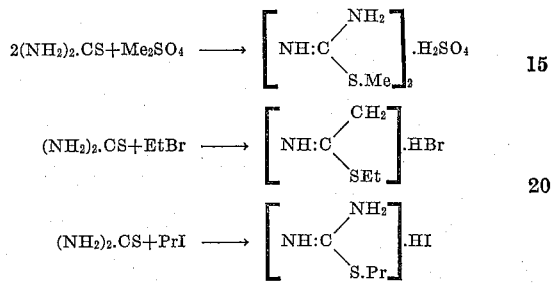

The sulfates can be converted into chlorides by treatment with barium chloride.

In the claims, by the term "lower alkyl isothiourea" I mean an alkyl isothiourea in which the alkyl group contains less than 5 carbon atoms.

It will be obvious that other denaturants which do not react with the alkyl isothiourea or hinder its decomposition on heating with alkali may be present.

What I claim as my invention and desire to be secured by Letters Patent of the United States is:

1. Denatured ethyl alcohol containing, as an essential denaturing element, a salt of a lower alkyl isothiourea, whereby a mercaptan is formed when the denatured alcohol is heated with caustic alkali.

2. Denatured ethyl alcohol containing, as an essential denaturing element, from 0.1 to 5 grams, approximately, per 100 cc. of 95% alcohol, of a salt of a lower alkyl isothiourea, whereby a mercaptan is formed when the denatured alcohol is heated with caustic alkali.

3. Denatured ethyl alcohol containing, as an essential denaturing element, from 0.1 to 0.5 grams, approximately, per 100 cc. of 95% alcohol, of a salt of a lower alkyl isothiourea, whereby a mercaptain is formed when the denatured alcohol is heated with caustic alkali.

HANS T. CLARKE.

CERTIFICATE OF CORRECTION.

Patent No. 2,216,431.　　　　　　　　　　　　October 1, 1940.

HANS T. CLARKE.

It is hereby certified that error appears in the printed specification of the above numbered patent requiring correction as follows: Page 1, second column, line 7, in the formula, for "HC:N" read --HN:C--; and that the said Letters Patent should be read with this correction therein that the same may conform to the record of the case in the Patent Office.

Signed and sealed this 19th day of November, A. D. 1940.

Henry Van Arsdale,
(Seal)　　　　　　　　　　　　　　Acting Commissioner of Patents.